United States Patent [19]
Nguyen et al.

[11] Patent Number: 6,167,551
[45] Date of Patent: Dec. 26, 2000

[54] DVD CONTROLLER WITH EMBEDDED DRAM FOR ECC-BLOCK BUFFERING

[75] Inventors: Hung Cao Nguyen, San Jose; Son Hong Ho, Los Altos, both of Calif.

[73] Assignee: NeoMagic Corp., Santa Clara, Calif.

[21] Appl. No.: 09/124,332

[22] Filed: Jul. 29, 1998

[51] Int. Cl.[7] .................................................. H03M 13/00
[52] U.S. Cl. ........................................ 714/770; 714/785
[58] Field of Search .................................. 714/769, 755, 714/770, 785, 754; 704/212; 380/50, 42; 710/61

[56] References Cited

U.S. PATENT DOCUMENTS

| | | | |
|---|---|---|---|
| 4,564,945 | 1/1986 | Glover et al. | 714/769 |
| 4,922,537 | 5/1990 | Frederiksen | 704/212 |
| 5,127,014 | 6/1992 | Raynham | 714/754 |
| 5,535,327 | 7/1996 | Verinsky et al. | 395/182.03 |
| 5,559,983 | 9/1996 | Masood | 395/439 |
| 5,581,715 | 12/1996 | Verinsky et al. | 395/309 |
| 5,650,955 | 7/1997 | Puar et al. | 365/51 |
| 5,701,283 | 12/1997 | Alon et al. | 369/44.41 |
| 5,805,712 | 9/1998 | Davis | 380/50 |
| 5,917,914 | 6/1999 | Shaw et al. | 380/42 |
| 5,920,578 | 7/1999 | Zook | 714/755 |
| 6,003,151 | 12/1999 | Chuang | 714/752 |
| 6,018,778 | 1/2000 | Stolowitz | 710/61 |

OTHER PUBLICATIONS

"DVD Demystified", Jim Taylor, McGraw–Hill, 1997, pp. 120–136 and 290–293.

*Primary Examiner*—Albert De Cady
*Assistant Examiner*—David Ton
*Attorney, Agent, or Firm*—Stuart T. Auvinen

[57] ABSTRACT

An embedded DRAM is incorporated inside a digital-versatile-disk (DVD) playback-controller integrated circuit. Data from the DVD optical disk is written to a data block in the embedded DRAM. Error correction is performed by reading the data block to generate syndromes and overwriting errors in the data block with corrections. Once the data block is corrected, it is copied or moved to a different area of the embedded memory, a host-buffer area. As the data block is moved, de-scrambling is performed to decrypt the data. The re-ordered data is stripped of overhead such as ECC bytes and written to the host-buffer area of the embedded DRAM. A checksum is generated as the data is moved, and the checksum is compared to a stored checksum to ensure that all errors were corrected. The data block in the host-buffer area is then transferred to a host. The embedded DRAM has a very wide data-access width of 16 bytes. The full width is used for writing data from the optical disk to the ECC data block buffer, and for reading data from the host-buffer area to the host. Narrower access widths are used by the error correction and de-scrambler blocks.

20 Claims, 8 Drawing Sheets

FIG. 1
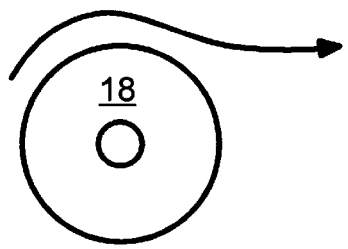
PRIOR ART
| 1 | 2 | ... | 171 | 172 | ECC | ROW 0 |
| 173 | 174 | ... | 343 | 344 | ECC | ROW 1 |
| | | ... | | | | ⋮ |
| 32681 | 32682 | ... | 32851 | 32852 | ECC | ROW 191 |
| COL ECC | COL ECC | ... | COL ECC | COL ECC | ECC | ROWS 192-207 |
| COL 0 | COL 1 | ... | COL 170 | COL 171 | COLS 172-181 | |
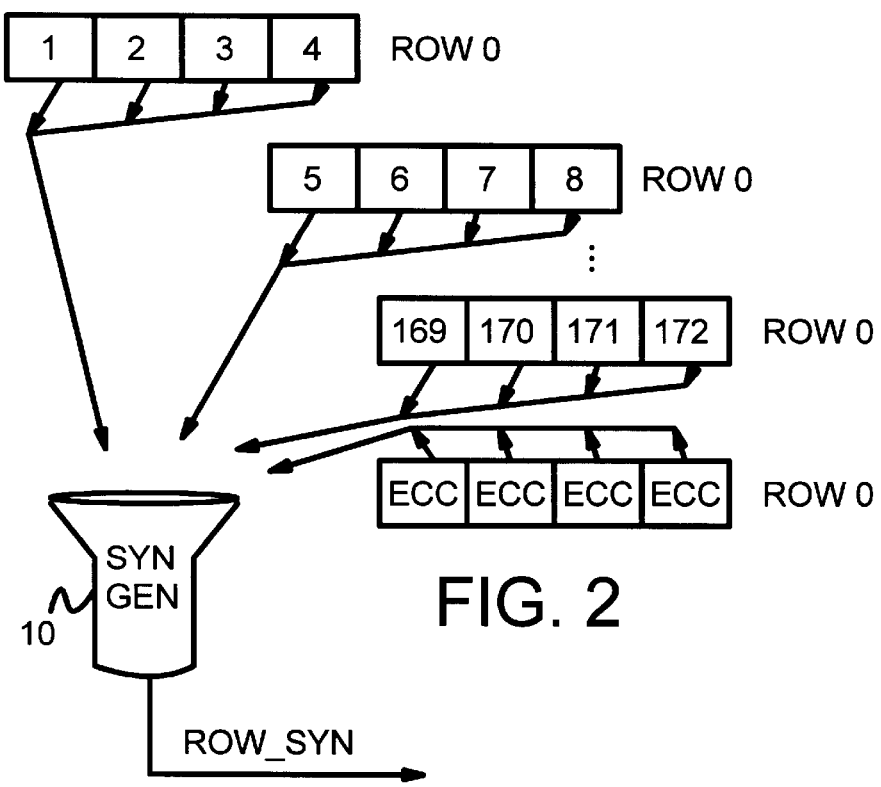
FIG. 2

DVD CONTROLLER WITH EMBEDDED DRAM FOR ECC-BLOCK BUFFERING

FIELD OF THE INVENTION

This invention relates to optical-disk readers, and more particularly to optical-disk controllers with integrated DRAM buffers for ECC-block buffering.

BACKGROUND OF THE INVENTION

The next generation of optical disks is known as digital-versatile disk (DVD). The CD-ROM drives on laptop and desktop PCs are being replaced with DVD drives. DVD has a much higher storage capacity than CD-ROM, enough that an entire motion picture can fit on a single DVD disk.

As with most personal computer (PC) hardware, cost and performance are key design constraints. Current DVD-ROM readers have too many components that drive up the cost and area, and performance has not yet reached desired levels. A more integrated DVD system is thus desirable.

The large amount of data read during playback and the low-cost reproduction methods of optical disks increases the likelihood of encountering at least some errors on playback. Error detection and correction is thus important for CD-ROM's and DVD's. Data from CD's and DVD's are arranged into larger blocks that have error-correction information appended. Multiple error-correction bytes allow errors to not only be detected but also located and corrected.

FIG. 1 illustrates a DVD data block with error correction for both rows and columns. Such blocks are typically stored in a buffer while being processed. Performance may dictate that higher-speed static random-access memory (SRAM) buffers rather than lower-cost dynamic random-access memory (DRAM) buffers be used.

Data from DVD disk 18 is read sequentially and stored in a block of data. As the data is read from DVD disk 18, it begins filling row 0 with data bytes 1, 2, 3 . . . until 182 bytes have been read. Error-correction information (ECC) for row 0 is contained in the last ten bytes of the row. Data from DVD disk 18 then begins filling the second row (row 1) with data bytes 173, 174, etc. until a second row of 172 data bytes and 10 ECC bytes has been transferred. Additional ECC bytes for the second row are contained in the last 10 bytes of row 1.

Subsequent rows of data and row-ECC information are read from DVD disk 18 and stored in a buffer memory block until all 192 rows of data have been transferred. Finally, sixteen rows of ECC bytes are read. ECC bytes in the final 16 rows are error-correction bytes for columns of data. For example, the first ECC byte in each of the last 16 rows is for column 0, which includes data byte 1 from row 0, data byte 173 from row 1, . . . , and data byte 32681 for data row 191, a total of 192 data bytes, each from a different row.

Row and Column ECC

DVD provides for a more complex and effective ECC using correction for rows and columns. The ECC bytes at the end of a row can be used to detect, locate, and correct one or more errors within the row, but do not contain information on errors in other rows. Sometimes errors are too numerous to be detected or corrected in a row. Then the column ECC bytes can be used to find and correct the errors that are uncorrectable by the row ECC bytes. The ECC bytes at the bottom of a column are used to detect, locate, and correct one or more errors within the column.

Often the data and ECC bytes from the DVD disk are stored in a temporary buffer such as a static RAM buffer. Rows and columns are read to generate syndromes for each row and for each column. Syndromes are signatures or checksums formed by using a pre-defined mathematical operator on all data bytes and ECC bytes of a row or column. Polynomial operators are often used.

The syndromes are then compared to a pre-defined signature of zero to detect any errors in the row or column. The syndromes can often be used to locate and correct a detected error. Complex algorithms such those based on Reed-Solomon code are used with the ECC bytes as is well-known in the art.

ECC Syndrome Generation—FIG. 2

FIG. 2 highlights fetching from buffer memory for row syndrome generation. Column syndromes are generated in a similar fashion, but use narrower reads. A syndrome for a row is generated by "summing" all the data and ECC bytes for a row. This "summing" is not a standard addition, but rather a complex signature-generating operation of scaling and adding the 182 bytes in a row. Multiple cycles can be used, such as by adding one byte per cycle to a running scaled sum.

Syndrome generator 10 performs the signature-generating operation as the bytes from the row are input. The buffer memory containing the data block often can read out multiple bytes per cycle. Thus FIG. 2 shows four-byte reads. In a first cycle, bytes 1, 2, 3, 4 are read from the buffer memory and operated on by syndrome generator 10. In a next memory cycle, data bytes 5, 6, 7, 8 are read from memory and accumulated by syndrome generator 10, adjusting the syndrome. Each successive memory cycle can read four bytes at once when the buffer memory is a standard 32-bit memory.

Once all 172 data bytes have been read and accumulated by syndrome generator 10, then the final 10 ECC bytes are read and accumulated. The final accumulated value in syndrome generator 10 is the row syndrome for the current row. Once the row syndrome is latched, syndrome generator 10 is cleared and the process repeated for next row.

CD-ROM Controller with External DRAM—FIG. 3

FIG. 3 shows a prior-art CD-ROM controller using an external DRAM buffer. Servo controller 48 responds to firmware commands to position the optical head (laser) over a desired track on CD disk 17. The data read from the track on CD disk 17 is amplified and processed by digital-signal processor (DSP) 46 and the data stored into DRAM 40 by CD controller chip 49.

Q and P parity check and error correction is then performed on the data stored in external DRAM 40. ECC address generator 42 generates the addresses of the data read back for error correction. The address is multiplexed by DRAM controller 43 and applied to external DRAM 40 as a DRAM row address and then a DRAM column address. RAS and CAS signals are generated by DRAM controller 43 and used to strobe in the row and column addresses. The data read from external DRAM 40 is then processed for error correction by ECC checker 44 and corrections made. Finally, DRAM controller 43 sends the corrected data to a host such as a central processing unit (CPU) over a host bus.

Optical disk controllers are described by Verinsky et al. in U.S. Pat. Nos. 5,535,327 and 5,581,715, assigned to Oak technology, and by Masood in U.S. Pat. No. 5,559,983, assigned to Advanced Micro Devices.

While such optical-disk controllers have been effective for CD-ROM optical disks, DVD-ROM controllers use more complex error correction and operate at higher speeds. Because full-length motion pictures can be stored on DVD disks, scrambling, encryption, and copy-protection are necessary for DVD readers. The interface to external DRAMs can become a bottleneck limiting performance.

Embedded-DRAM Graphics Display Systems

The assignee has recognized the problem of bottlenecks to external DRAM in graphics display systems, and has pioneered embedded DRAM for graphics controllers. See for example: Puar et al., "Graphics Controller Integrated Circuit Without Memory Interface", U.S. Pat. Nos. 5,650,955 and 5,703,806. These embedded-DRAM graphics controllers have been used predominantly for portable PC's such as laptops and notebook PCs.

Although graphics controller are in a different technical field than optical-disk controllers, the inventors have realized that such embedded DRAM technology could solve performance and cost problems for DVD controllers. While many view embedded DRAM technology as useful only for portable systems, the inventors realize that desktop as well as laptop PCs could benefit from the performance and cost improvement of embedded DRAM.

What is desired is a high-speed optical-disk playback system suitable for the requirements of DVD. It is desired to use embedded DRAM as a buffer for error correction. A DVD controller with a higher-performance and higher-bandwidth buffer memory is desired. It is desired to improve performance of DVD functions such as disk buffering, syndrome generation, error correction, de-scrambling and decryption, and host transfers.

SUMMARY OF THE INVENTION

A digital-versatile disk (DVD) controller chip has a disk interface for receiving data read from a DVD optical disk. An embedded dynamic-random-access memory (DRAM) is coupled to receive the read data from the disk interface. The embedded DRAM stores the read data arranged as data blocks for error correction. The data blocks have rows containing data and error-correction information.

An error corrector is coupled to the embedded DRAM. It reads the data blocks and determines an error location of an error in the data block. The error corrector over-writes data at the error location of the error in the data block with a correction. A host interface is coupled to the embedded DRAM. It transfers corrected data blocks to a host bus. Thus data blocks from the DVD optical disk are corrected in the embedded DRAM before transfer to the host bus.

In further aspects the error corrector has a syndrome generator. It reads data and error-correction information in a column of the data block to generate a column syndrome. A syndrome comparator compares the column syndrome to a predefined value. The predefined value is the same value for all columns in the data block. An error in the column is signaled when the column syndrome does not match the predefined value. A data corrector is activated when the error in the column is signaled. It determines the error location of the error within the column over-writing data in the column with the correction. Thus the data block is read for syndrome generation and error-corrected while residing in the embedded DRAM.

In further aspects a row-syndrome generator is coupled to the disk interface. It generates a row syndrome for each row of the data block. A row-syndrome writer is coupled to the row-syndrome generator and to the embedded DRAM. It writes the row syndrome to the embedded DRAM. The error corrector reads the row syndrome stored in the embedded DRAM. The error corrector includes detection means for detecting errors in a row by comparing the row syndrome to the predefined value and row-correction means for over-writing a row error in the row with a row correction. Thus row syndromes are stored in the embedded DRAM.

In further aspects the embedded DRAM has a disk-buffer region for storing a plurality of data blocks at different stages of error correction. A row-syndrome buffer stores the row syndromes for a data block in the disk-buffer region. A host-buffer region stores corrected data blocks for transfer to the host bus. A firmware-buffer region is coupled to a microcontroller. It stores parameters used by firmware routines executing on the microcontroller. The firmware routines access the DVD optical disk. Thus the embedded DRAM also serves as a scratch-pad memory for the firmware routines executing on the microcontroller.

BRIEF DESCRIPTION OF THE DRAWINGS

FIG. 1 illustrates a DVD data block with error correction for both rows and columns.

FIG. 2 highlights fetching from buffer memory for row syndrome generation.

DETAILED DESCRIPTION

The present invention relates to an improvement in optical-disk controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that embedded DRAM technology could solve performance and cost problems for DVD controllers. While many view embedded DRAM technology as useful only for portable-computer graphics-display systems, the inventors realize that desktop as well as laptop PCs could benefit from the performance and cost improvement of embedded DRAM.

The inventors also realize that unusually wide data paths are feasible with embedded DRAM. These wider data paths allow more bytes to be stored or retrieved in a cycle, increasing bandwidth. DVD systems are starved for bandwidth for some speed-critical functions, such as writing data from the DVD disk to the buffer, and reading corrected blocks from the buffer to the host. Error correction may not directly benefit from the wider data paths, since syndrome generation can only process a few bytes at a time because of the complex calculations required. Thus some functions require wide data access while other DVD functions do not.

Figure 4:
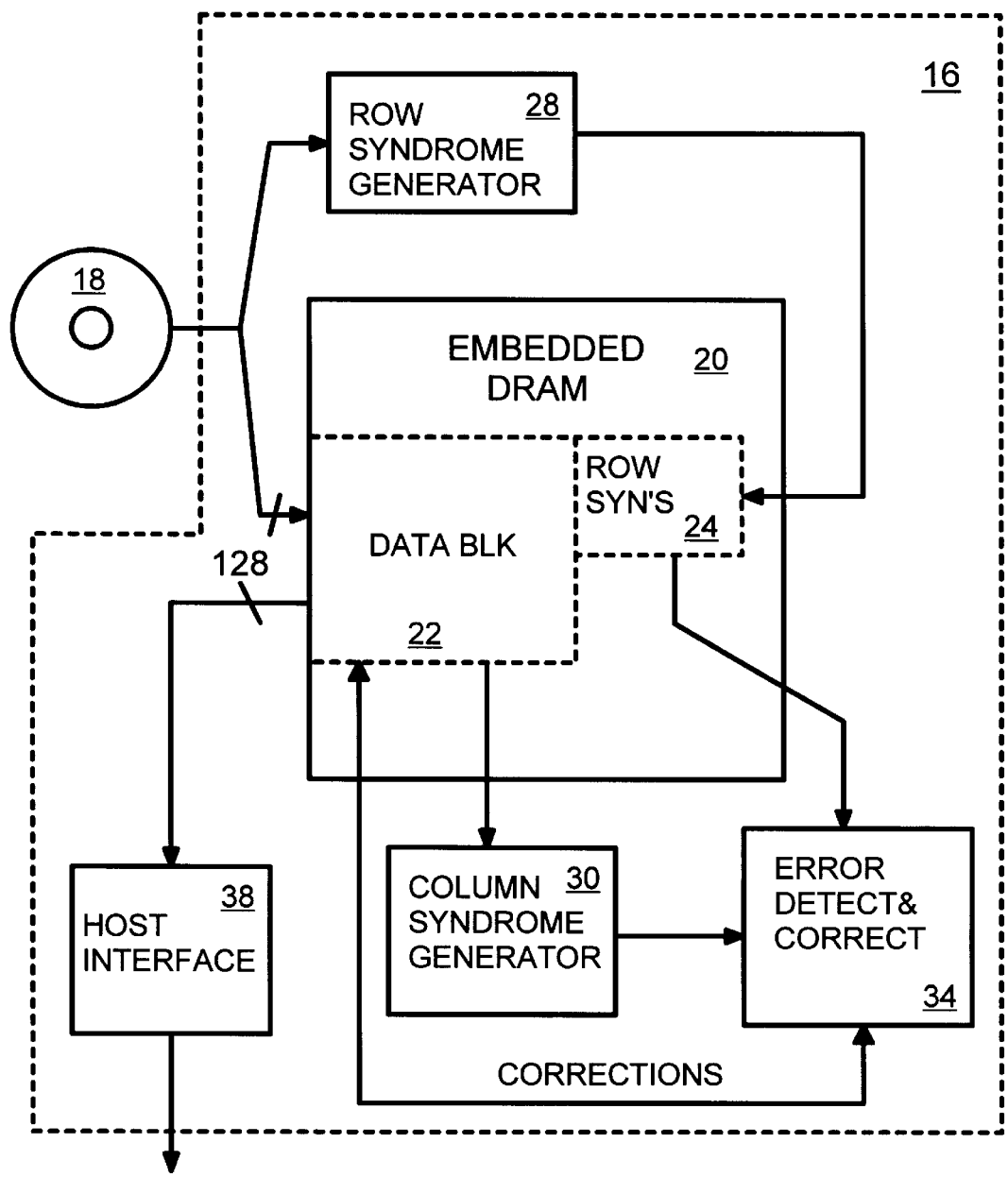
FIG. 4 is a diagram of a DVD player chip with an embedded DRAM for the buffer memory.

DVD Player with Embedded DRAM Buffer—FIG. 4

FIG. 4 is a diagram of a DVD player chip with an embedded DRAM for the buffer memory. Embedded dynamic random-access memories (DRAMs) have been developed by the assignee and widely used in graphics accelerators for notebook personal computers. See for example, "Graphics Controller Integrated Circuit Without Memory Interface", U.S. Pat. Nos. 5,650,955 and 5,703,806.

Data is read from DVD disk 18 and into DVD controller chip 16. DVD controller chip 16 is an integrated circuit that may include a DVD controller that interfaces with the electronics of an external DVD disk player. The error correction and data paths of DVD controller chip 16 are shown in FIG. 4 while other portions are not shown.

Embedded DRAM 20 is a large 512-Kbyte memory array within DVD controller chip 16. Dynamic rather than static memory is used to allow for a much larger memory capacity. Since each data block 22 occupies at least 208×182 (37856 bytes including ECC), embedded DRAM 20 can hold 13 data blocks 22. As is shown later in FIG. 5, the large capacity of embedded DRAM 20 allows for pipelining of several data blocks, improving performance. A smaller SRAM memory would not have enough capacity for storing several data blocks in a pipeline. A refresh controller (not shown) refreshes the DRAM.

Row Syndrome Generation

Data read from DVD disk 18 to DVD controller chip 16 is written to data block 22 in embedded DRAM 20. As each data byte is read into DVD controller chip 16, it is also sent to row syndrome generator 28. Row syndrome generator 28 generates the row syndrome for the current row being written to embedded DRAM 20 by accumulating each data and row ECC byte into registers storing the row syndrome. Once the last ECC byte in a row is written to embedded DRAM 20 and accumulated by row syndrome generator 28, the registers in row syndrome generator 28 are copied to embedded DRAM 20 and stored as the row syndrome for the row just written. Pointers are used to locate the current row syndrome being written in row syndrome storage 24 within embedded DRAM 20.

Row syndrome generator 28 is cleared as the next row of data and ECC bytes begins to be read from DVD disk 18. The row syndrome for the next row is generated as row syndrome generator 28 accumulates each byte as each byte is written into data block 22 of embedded DRAM 20. Once all data and ECC rows are written to data block 22, a new area of embedded DRAM 20 is set aside for the next data block. The data stream from DVD disk 18 is then written to rows in the next data block.

Once at least one row of data block 22 has been transferred from DVD disk 18 to embedded DRAM 20, rows are checked for errors and error correction is attempted.

Error detector and corrector 34 reads the first row's syndrome from row-syndrome storage 24 of embedded DRAM 20 and compares the generated row syndrome to a predetermined syndrome of zero for all rows. If the syndromes match, no error is detected and error detector and corrector 34 reads the next row's syndrome from row syndrome storage 24.

When error detector and corrector 34 detects an error, error correction is attempted on the row. The location of the error is determined using standard but complex techniques, such as solving a Euclidean Algorithm or polynomial using the generated row syndrome and initial conditions. See for example, U.S. Pat. No. 5,027,357 by Yu et al. Whiz uses a Reed-Solomon code such as the X3B11 standard and U.S. Pat. No. 5,517,509 by Yoneda that describes decoding ECC and locating errors using Euclid's algorithm and a Chien search.

When error detector and corrector 34 successfully locates an error in the row, the row is corrected by performing a read-modify-write cycle at the location of the error within data block 22 in embedded DRAM 20. Many clock cycles of computation may be required to detect and correct errors. Some detected errors may not be correctable with only the row syndrome. A flag can be set when such uncorrected errors are detected. The column syndromes are later used to attempt to correct these errors that are not correctable by the row syndromes.

Column Syndrome Generation After Row Corrections

Once the last row of data block 22 has been transferred from DVD disk 18 to embedded DRAM 20, and once error detector and corrector 34 has corrected all rows of data block 22, column syndromes are generated. It is preferable to wait for column-syndrome generation until all possible row corrections have been written to data block 22, since fewer errors need to be corrected using the column syndromes.

Column syndrome generator 30 reads one or more columns of data from data block 22 and generates one or more column syndromes for the columns read. Since the data and ECC bytes are read from DVD disk 18 and written to embedded DRAM 20 in row order, the bytes in a column are separated by an entire row, 182 bytes. Since this is much larger than the width of the memory fetch, separate fetches are required for each byte in the column. Each of the column's bytes is in a separate row.

Once all column syndromes have been generated, and all columns corrected, error correction is completed for data block 22. Host interface 38 transfers data block 22 to a host interface such as a ATAPI bus on a personal computer or an internal bus on a TV-set-top DVD player. Host interface 38 ignores the ECC bytes, transferring only the data bytes. Once all rows of data are transferred from embedded DRAM 20 to the host, data block 22 can be marked invalid and the storage area re-used for another data block from DVD disk 18.

Wide Data Paths

The embedded DRAM 20 uses a wide data path of 128 bits (16 bytes per fetch or write). Data from disk 18 is accumulated until 16 bytes can be simultaneously written to embedded DRAM 20. Likewise, when a corrected block is transferred to the host by host interface 38, 128-bit reads of corrected block 22 in embedded DRAM 20 are used to read 16 bytes with each memory access cycle.

Other memory accesses do not require the wide path and perform 32-bit accesses, or use only a few of the bytes of the data path to embedded DRAM 20. For example, row syndromes generated by row syndrome generator 28 can be written as a 10-byte write after each row syndrome is generated. Error detector and corrector 34 and column-syndrome generator 30 may likewise require smaller reads of embedded DRAM 20. The read-modify-write cycles for corrections also operate on only a subset of the data width.

Figure 5:
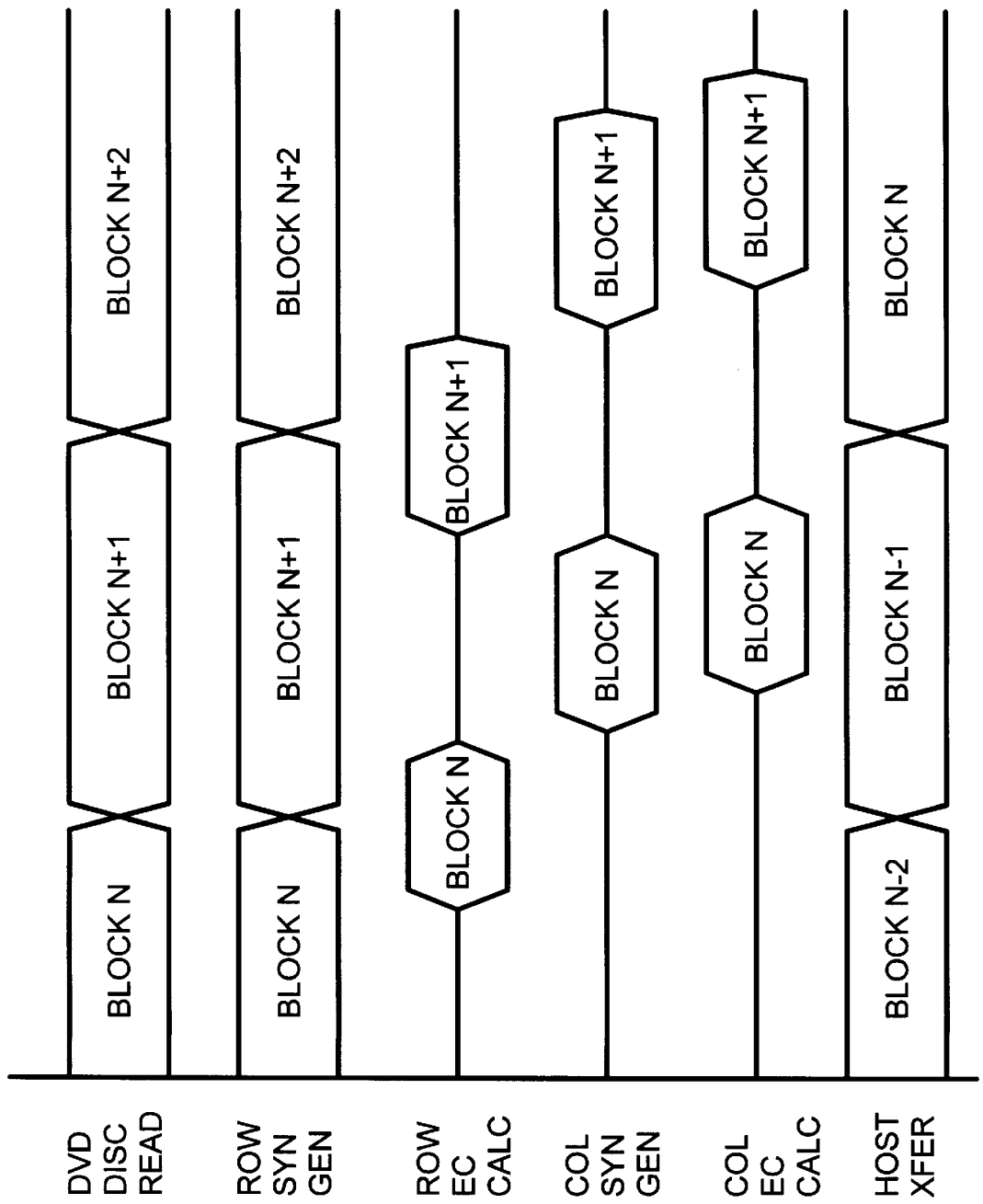
FIG. 5 illustrates the pipelining of blocks of DVD data during error detection and correction.

Pipelining of DVD Blocks—FIG. 5

FIG. 5 illustrates the pipelining of blocks of DVD data during error detection and correction. A DVD block has 208 rows each with 182 bytes, including ECC bytes. Data and ECC bytes for all 208 rows of DVD block N are read from the DVD disk and written to the embedded DRAM. As each row is read from the DVD disk and written to the embedded DRAM buffer, the row syndrome is generated. Thus all the row syndromes for DVD block N are generated at about the same time the data is read from the DVD disk.

The following DVD blocks N+1 and N+2 likewise are read from the DVD disk and written to the embedded DRAM while the row syndromes are generated on the fly. This is shown by the upper two waveforms of FIG. 5.

Error detection and correction (EC) for the rows of DVD block N can begin once at least the first row has been written to the embedded DRAM. As shown in FIG. 5, EC calculations begin near the end of reading block N and continue through while the first rows of next block N+1 are read from the DVD disk. EC calculations require less time than does reading the block from the DVD disk, since reading from the optical DVD disk is relatively slow.

As the row EC calculations are performed, any detected errors are corrected by over-writing the faulty data in the embedded DRAM. Once all row corrections are completed, the partially-corrected DVD block in the embedded DRAM is read, column-by-column, for 172 columns, for generating the column syndromes. After each column is read and its column syndrome generated and latched, the error detector and corrector calculates the location of any errors in each column. Corrections are written to the columns in the embedded DRAM. Since each column is corrected just after its syndrome is generated, all 172 column syndromes do not have to be stored at the same time. The column EC calculation waveform "COL EC CALC" overlaps the column syndrome generation "COL SYN GEN" waveform but is delayed slightly.

The error detector and corrector is first used for row error detection and correction for block N, and later used for column error detection and correction for the same clock N. The same error detector and corrector engine is used for both row and column corrections. Column error detection does not occur until the next DVD block N+1 is being read from the DVD disk. The column syndromes for a block are generated while the next block's row syndromes are being generated. Thus row and column syndrome generation is pipelined.

Once all the column corrections are completed, EDC is done by reading all data back and checking a 4-byte EDC at the end of each sector. The DVD block is then clean and ready to be transferred to the host. Host transfer for DVD block N occurs while DVD block N+2 is being read from the DVD disk to the embedded DRAM. Thus each DVD block is pipelined for a period about equal to the read tine for 2 DVD blocks.

Such a pipeline requires that up to 3 DVD blocks be stored in the embedded DRAM buffer, along with the row syndromes for about one and a half blocks. Each block is about 40 Kbytes, with overhead, so a total memory of 120 Kbytes is needed for the 3-block-deep pipeline. This is about a 1 megabit memory.

Figure 3:
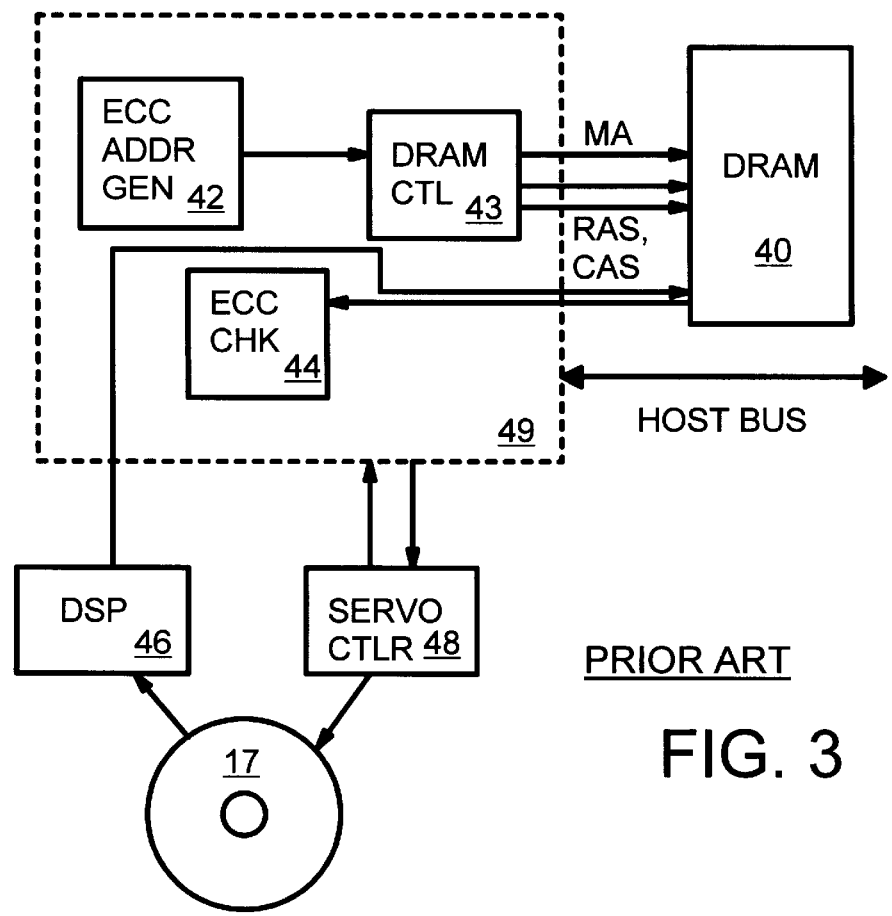
FIG. 3 shows a prior-art CD-ROM controller using an external DRAM buffer.
Figure 6:
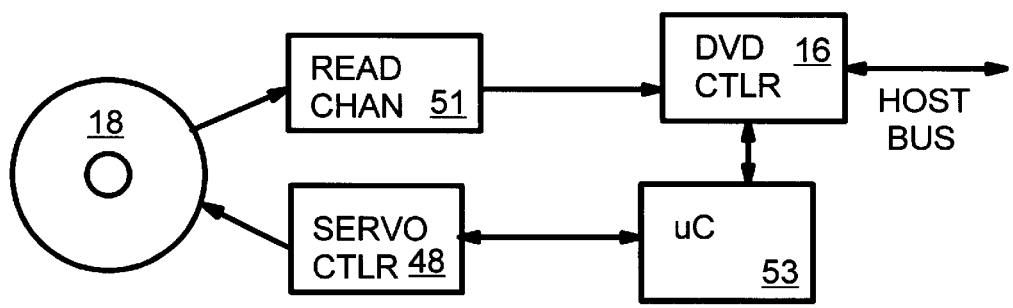
FIG. 6 is a diagram of a DVD reader system that uses a DVD controller chip with an embedded DRAM for buffering ECC blocks.

DVD Controller with Embedded DRAM Simplifies System—FIG. 6

FIG. 6 is a diagram of a DVD reader system that uses a DVD controller chip with an embedded DRAM for buffering ECC blocks. Microcontroller 53 contains a ROM with firmware instructions that process high-level commands from the host processor. Some commands cause microcontroller 53 to find data on a different track. Microcontroller 53 instructs servo controller 48 to move the optical read head and the laser to a different radial position on the spinning disk. Data from DVD disk 18 is then read and amplified by read channel 51, and converted from NRZI format to binary data bits. DVD controller 16 receives these binary bits, converts them to bytes from the modulated run-length-limited (RLL) coding used, and stores them in its embedded DRAM buffer. DVD controller 16 then generates row and column syndromes, and performs error checking and correction on the data blocks in the embedded DRAM. This error correction is complex, requiring many steps and many reads and writes to the data block in the embedded DRAM. Since the embedded DRAM is contained within the integrated circuit chip of DVD controller 16, wide data paths can be used that do not increase the pin count. Pins on an IC are expensive as they increase packaging costs and the size of the chip.

Content-scrambling-system (CSS) de-scrambling of the data blocks are also performed by DVD controller 16, using an encryption key stored on DVD disk 18 that is not otherwise readable by the host. Security is increases when the key is processed by an integrated controller such as DVD controller 16, since this minimizes the ability to observe the key data on external busses.

Once the data block has been corrected and a final error check performed, the corrected data block is transferred from the embedded DRAM to the host bus. The only time the data block is transferred on or off DVD controller 16 is when it is initially read from DVD disk 18, and when it is transferred to the host. Off-chip transfers are thus minimized.

An external DRAM or SRAM buffer for the data blocks is not needed, reducing the size and complexity of the board-level system. Cost can be reduced since fewer IC chips need to be placed on the circuit board. Performance is increased since external DRAM chips tend to be slower than embedded memories.

Figure 7:
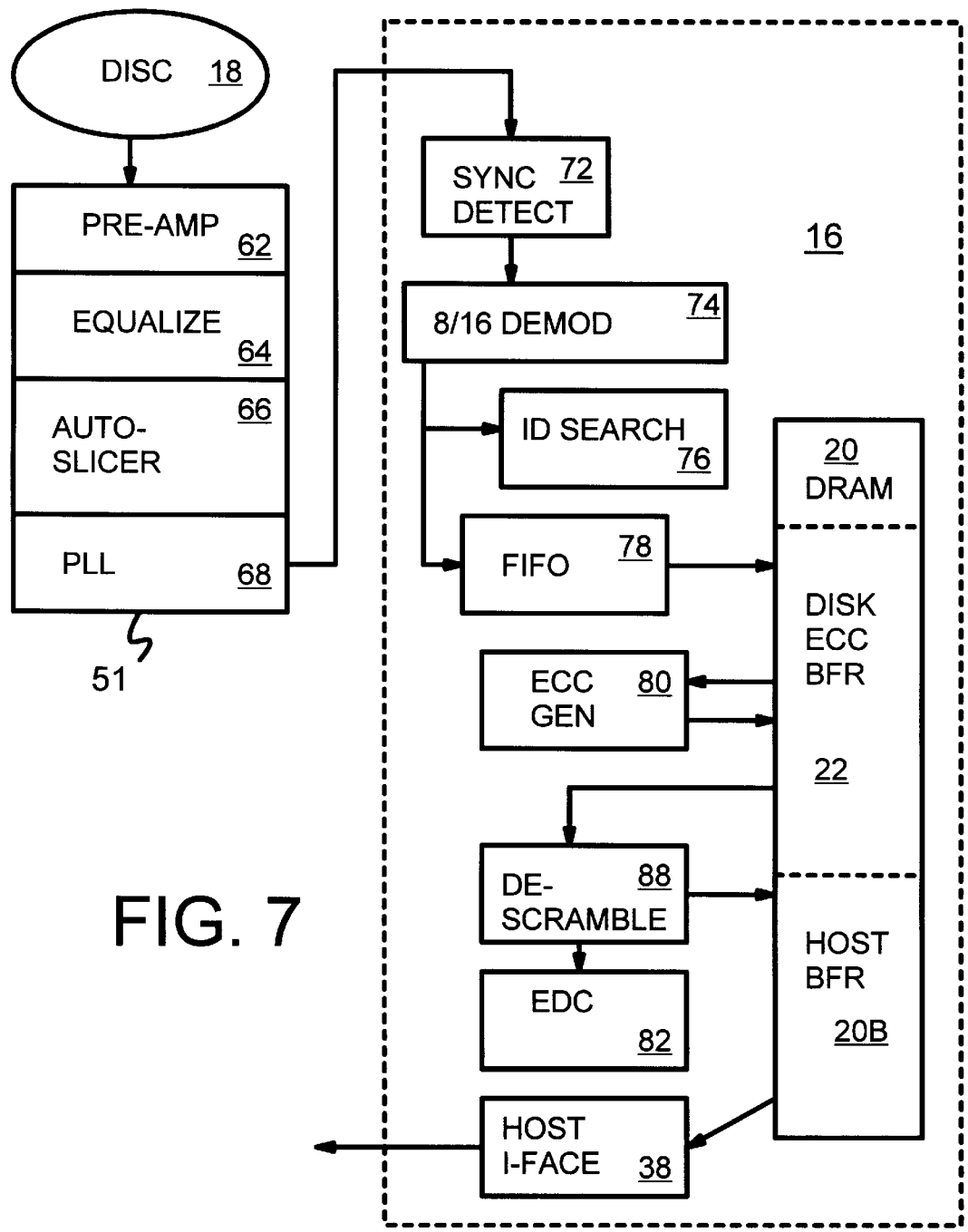
FIG. 7 is a block diagram of a DVD reader system highlighting the read path from the disk to the embedded DRAM.

DVD Interface Logic—FIG. 7

FIG. 7 is a block diagram of a DVD reader system highlighting the read path from the disk to the embedded DRAM. Data is read from DVD optical disk 18 and amplified by pre-amp 62 in read channel 51, which may be a read-channel IC chip. Equalizer 64 stabilizes the signal, followed by auto-slicer 66. Phase-locked loop (PLL) 68 recovers the clock from the data's NRZI format and extracts the binary data from the combined signal. The RZ binary data is then sent from read channel 51 to DVD controller 16. DVD controller 16 receives the RLL-encoded data, and detects synchronization (sync) marks at the beginning of each physical sector. Sync detector 72 generates a sync clock used to arrange the data stream into sectors. Demodulator 74 converts the 16-bit RLL codewords into 8-bit bytes of data. Data is formatted as (3,10)-RLL codewords on optical disk 18 so that the physical pits on the disk have a minimum size of 3 bits, and to reduce errors.

The demodulated bytes from demodulator 74 are sent to FIFO 78, and the header identifiers are detected by ID searcher 76 to determine if the sector read is the desired sector. When the correct sector is found, data from FIFO 78 is written to an empty area of embedded DRAM 20 as a new sector of ECC data block 22. Several ECC data blocks can be stored in embedded DRAM 20.

The data read from DVD optical disk 18 is error-prone, especially at higher reading speeds. Errors are introduced at higher read speeds even when the physical data on the disk is correct. Data block 22 in embedded DRAM 20 is corrected in a multi-step process of generating syndromes for rows and columns, and locating errors and over-writing data. ECC generator 80 reads all bytes of data block 22 to generate column syndromes, and then compares the generated syndromes to zero. When the syndromes are non-zero, an error has been detected. Highly-complex algorithms are used to locate the error and correct it.

De-scrambler 88 removes the scrambling pattern embedded in the disk data stream for the recording process. The re-arranged data is written to host buffer 20B in embedded DRAM 20. Thus the data block 22 is written in to embedded DRAM 20, then errorcorrected, and then copied to a different area of embedded DRAM 20, in host buffer 20B. The ECC bytes at the end of each row and column can be stripped out so that only the data is written back to host buffer 20B.

EDC checker 82 performs a final error check, generating a checksum and comparing it to a checksum stored with the data. In one embodiment, EDC checker 82 operates with de-scrambler 88 to generate the checksum as the data is being written by de-scrambler 88 back to the host buffer in the embedded DRAM. This eliminates extra read cycles for EDC checker 82.

When the checksums match, the data block is ready for transfer to the host. Host interface 38 reads the blocks of data from host buffer 20B in embedded DRAM 20 and transfers them over a host bus to the host processor.

Figure 8:
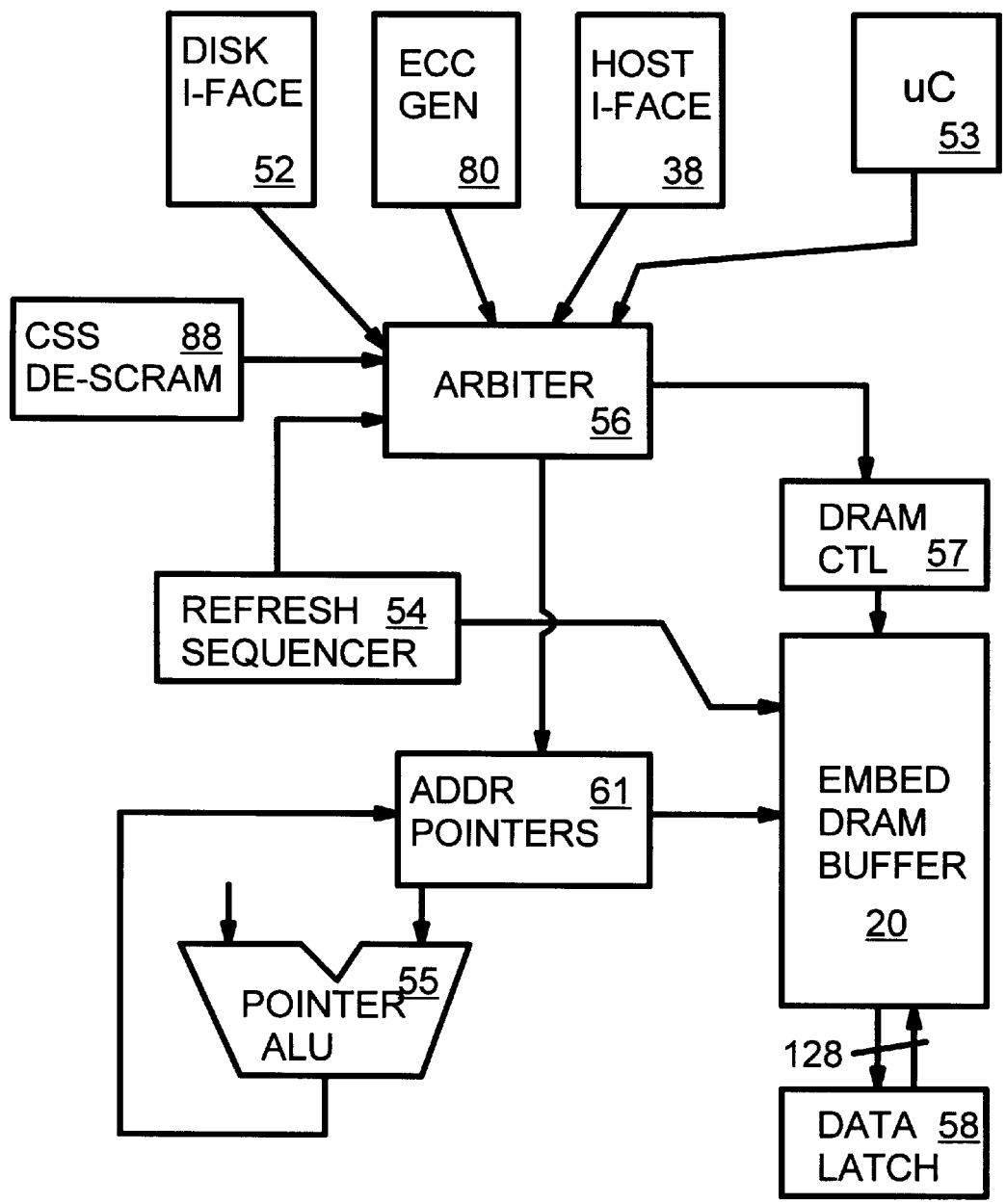
FIG. 8 is a diagram of access management to the embedded DRAM.

DRAM Access Management—FIG. 8

FIG. 8 is a diagram of access management to the embedded DRAM. Several DVD functions require access to the embedded DRAM. Disk interface 52 needs to perform 16-byte writes of new data read from the optical disk, while host interface 38 needs to execute 16-byte reads to send corrected and de-scrambled data to the host. ECC generator 80 needs to read the data blocks to generate syndromes and write corrections back to the data block. De-scrambler 88 needs to read scrambled data from the ECC buffer and write de-scrambled data back to the host buffer blocks. The final EDC error check can be performed in parallel with de-scrambling.

Microcontroller 53 occasionally needs to read from a scratch memory area in embedded DRAM 20, or check data in the data blocks. Refresh sequencer 54 periodically refreshes a DRAM row and thus needs access time for refreshing.

Arbiter 56 performs arbitration for access of embedded DRAM 20 by disk interface 52, ECC generator 80, host interface 38, microcontroller 53, de-scrambler 88, and refresh sequencer 54. Arbitration is performed by a round-robin scheme, providing each requester access in a fixed sequence for each round of arbitration. A requestor can perform several memory access cycles during a round before the next requestor gains memory access, such as the host interface bursting data to the host bus, or the disk interface performing a series of DRAM-page-mode cycles.

DRAM controller 57 generates timing signals to embedded DRAM 20 to read or write data. Since embedded DRAM 20 is integrated within DVD controller 16 on the same silicon substrate, the address bus does not have to be multiplexed for the DRAM's row and column address. Instead, the entire address can be presented at the same time by address pointer 61 to embedded DRAM 20. A RAS and a CAS signal are used to begin accessing a memory location. For reads, data is read out to data latch 58 when embedded DRAM 20 is accessed by the CAS signal. For writes, a latch signal writes the data into data latch 58, which is then written to the core cells of embedded DRAM 20. Data latch 58 contains a 16-byte (128-bit) latch that connects to disk interface 52, ECC generator 80, host interface 38, microcontroller 53, and de-scrambler 88.

Address pointers 61 contains pointers to the currently-accessed memory locations for the host interface, disk interface, ECC generator, microcontroller, and de-scrambler. Pointer ALU 55 is an arithmetic-logic-unit that increments or decrements each pointer by the data width as each access occurs. More complex pointer calculations are performed by pointer ALU 55 when jumping to a new sector or block.

Figure 9:
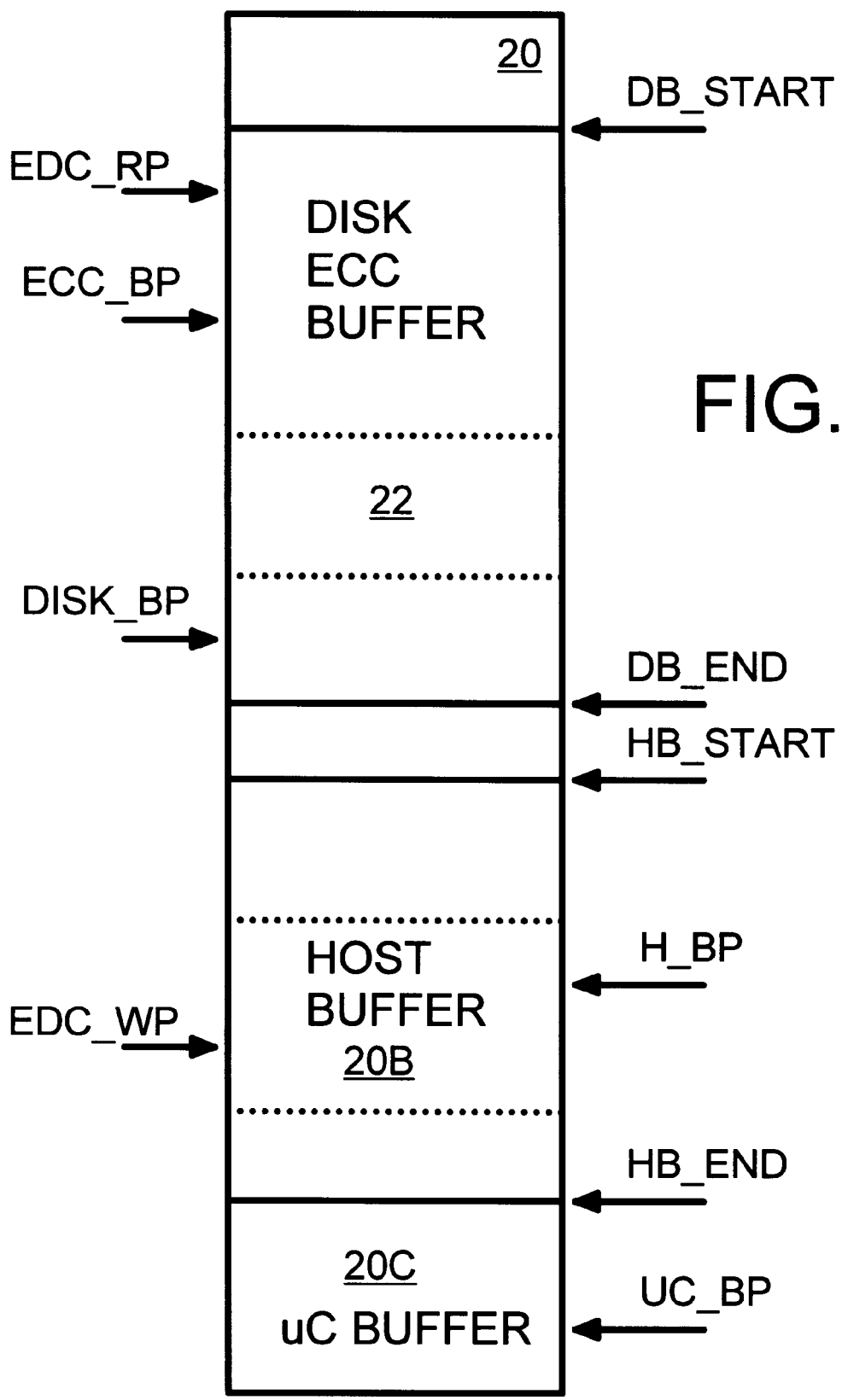
FIG. 9 illustrates that the DVD embedded DRAM contains ECC data blocks and host data blocks.

Embedded DRAM includes ECC and Host Buffers—FIG. 9

FIG. 9 illustrates that the DVD embedded DRAM contains ECC data blocks and host data blocks. Embedded DRAM 20 is divided into several regions or buffers for different uses. A disk buffer is used to buffer the data blocks 22 from the DVD optical disk. Error correction is performed on data blocks 22 while they reside in the disk buffer region. The start and ending addresses of the disk buffer that contains ECC data blocks 22 is pointed to by the start and end disk-buffer pointers, DB_START and DB_END. These pointers can be adjusted by firmware as the memory is managed for more efficient buffering.

Data from the disk is demodulated and written to data block 22 at a location pointed to by disk buffer pointer DISK_BP. As the ECC generator reads the data for syndrome generation and error checking, the ECC buffer pointer ECC_BP locates the next data to be read or written.

Once error correction of ECC data blocks 22 is completed, data blocks 22 are read from ECC data blocks 22 in the disk buffer region by the de-scrambler. The de-scrambler reads from the disk buffer at the location of the EDC read pointer EDC_RP. The data read by the de-scrambler is de-scrambled and the EDC checksum generated.

As the de-scrambler re-orders the data in each sector, it writes them to a different area of memory. The de-scrambled data is stripped of the ECC bytes and written to host buffer 20B. Host buffer 20B has starting and ending addresses indicated by host-buffer starting and ending pointers HB_START and HB_END. The current data being written by the de-scrambler/EDC checker is indicated by the EDC write pointer, EDC_WP.

After the final checksums are generated and successfully compared, the host block are transferred to over the host bus. The host-bus pointer H_BP points to the data currently being transferred to the host interface. Contiguous memory locations are used for host buffer 20B so that data can be busted out to the host interface as quickly as possible using the DRAM's page mode.

The microcontroller also has a scratch-pad area of embedded memory for firmware use. Microcontroller buffer 20C is read and written by the microcontroller's firmware at the microcontroller buffer pointer's location, UC_BP. Other pointers may also be used, such as a row-syndrome write pointer. Row syndromes can be stored in an unused area of embedded DRAM 20.

Figure 10:
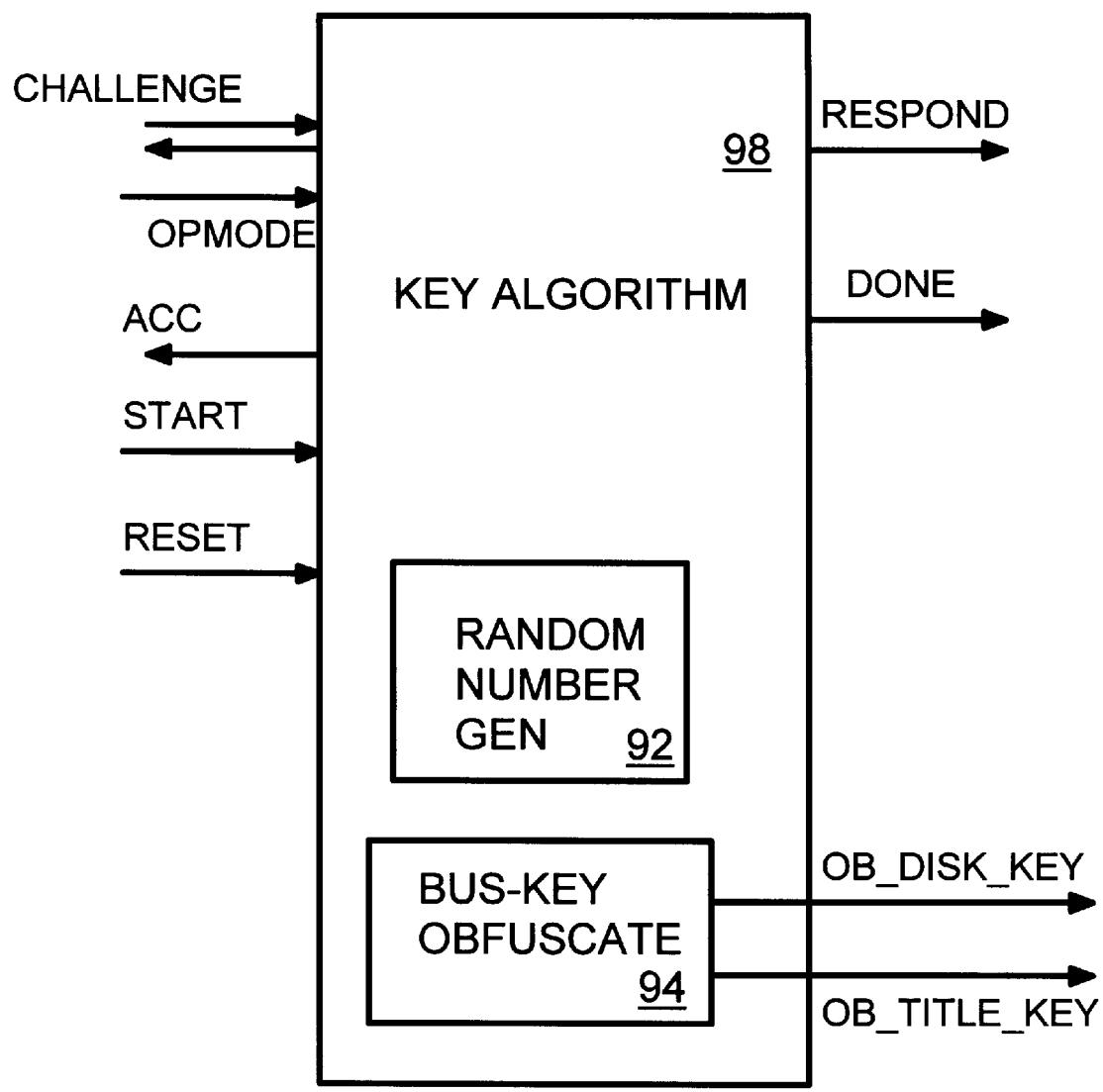
FIG. 10 is a diagram of a key-algorithm block in a CSS de-scrambler.

CSS De-Scrambler—FIG. 10

FIG. 10 is a diagram of a key-algorithm block in a CSS de-scrambler. This CSS descrambler is used only for keys, and can be located with de-scrambler 88. A disk key and title keys are stored in a leading area of the DVD optical disk. This leading area is not readable by the host. These keys are used with randomly-generated keys to decrypt the data when the CSS de-scrambler reads and decrypts the data in a sector. The re-ordered, decrypted data is written back to a separate area of the embedded DRAM, the host block area.

The DVD controller chip contains a content-scrambling-system CSS de-scrambler that operates as defined by an industry-standard key exchange and authentication specification for DVD. CSS de-scrambler 88 includes a key algorithm block 98 that performs key generation and authentication operations. The disk and title keys read from the DVD disk are hidden or obfuscated using another key that is locally generated. This prevents the title or disk key from being read by a logic analyzer connected to external data busses.

Copy-protection capabilities of the system are communicated to key algorithm block 88 as a code written into a register by the microcontroller's firmware. A challenge key generated by the microcontroller is combined with a locally-generated random number from random number generator 92 to create a key and another challenge key in reply. An opmode is sent to key algorithm block 98 to specify the operation performed. A start signal begins the operation while a reset input resets the block. A response key and a done signal are generated by key algorithm block 98.

When the microcontroller requests the disk or title key, a bus key is generated using the other keys already generated during the earlier key exchanges with the microcontroller. The disk and title keys are hidden by being combined with the exchanged keys to generate obfuscated bus keys, using bus-key obfuscator 94.

The generated key is then used by CSS de-scrambler 88 to re-arrange the data in each sector using a proprietary algorithm that is not available to the public to prevent unauthorized copying of DVD titles.

ADVANTAGES OF THE INVENTION

A high-speed optical-disk playback system is suitable for the requirements of DVD. An embedded DRAM is used as a buffer for error correction. A DVD controller with a higher-performance and higher-bandwidth buffer memory is achieved using the embedded DRAM. Performance of DVD functions such as disk buffering, syndrome generation, error correction, de-scrambling and decryption, and host transfers is improved due to the wider access width of the embedded DRAM.

The embedded DRAM provides enough storage so that data blocks that are error corrected can be written to a different region of memory after being re-ordered during de-scrambling for copy protection. Data blocks are thus copied to a different buffer area before transfer to the host. This copying also has the advantage that ECC bytes and other overhead information can be stripped off before being stored to the host buffer area. Host transfers can occur at a higher speed since the ECC bytes do not have to be removed as the host transfer occurs. Pin-count and power consumption are reduced by integrating the RAM with the DVD controller.

ALTERNATE EMBODIMENTS

Several other embodiments are contemplated by the inventors. For example FIFO buffers or pipeline latches can be inserted into the circuitry at many points, such as to and from the embedded memory. Other circuit implementations are possible. Many variations of Reed-Solomon code can be used for the ECC bytes as the invention is not limited to a certain type of coding or error-correction methods. While the term byte has been used with reference to an 8-bit quantity, it should be realized that other data widths can be used. For example, it is possible that future DVD systems will operate on two or four-byte data words or fields.

While a 16-byte fetch or read from the buffer memory has been described, other fetch sizes can be used with the invention. With embedded memories in particular, much larger fetch sizes are common. For example, a 128-bit (16-byte) interface is used by the assignee for an embedded memory in a graphics controller, and a 256-bit (32-byte) interface is contemplated. Such a wide interface is practical for embedded memories but not for external memories because package pins on the chip are not needed for the memory interface when embedded memories are used. A smaller 8-byte interface allows cost to be reduced.

The fetch size is typically defined by the width in bytes of the interface between the memory and other circuits. Sometimes this width can vary, perhaps being larger for the host or disk interface but smaller for interfaces to ECC blocks. Data at the beginning and ends of blocks may not align exactly to 16-byte boundaries, so smaller accesses occur at the boundaries.

Timing of the various pipelined blocks can be controlled by a central controller. Flags or bits can be set or cleared upon completion of tasks for a block, such as completion of reading from the DVD disk, completion of generation of all the row syndromes, row error correction, etc. DVD-RAMs that are writeable can be used when the invention is modified for writing as well as reading data from the disk. The invention may be adapted for future extensions of DVD or future optical disk standards.

The DVD controller may also be used to read older CD-ROM disks. In CD mode, de-scrambling is done as data enters the chip. The ECC data blocks are not copied to the host area before transfer to the host; instead, the data blocks are transferred directly from the ECC buffer area to the host interface.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A digital-versatile disk (DVD) controller chip comprising:

a disk interface for receiving data read from a DVD optical disk;

an embedded dynamic-random-access memory (DRAM), coupled to receive the read data from the disk interface, the embedded DRAM storing the read data arranged as data blocks for error correction, the data blocks having rows containing data and error-correction information;

an error corrector, coupled to the embedded DRAM, for reading the data blocks and determining an error location of an error in the data block, the error corrector over-writing data at the error location of the error in the data block with a correction; and a host interface, coupled to the embedded DRAM, for transferring corrected data blocks to a host bus, wherein data blocks from the DVD optical disk are corrected in the embedded DRAM before transfer to the host bus.

2. The DVD controller chip of claim 1 wherein the error corrector further comprises:

a syndrome generator, coupled to the embedded DRAM, for reading data and error-correction information in a column of the data block in the embedded DRAM to generate a column syndrome;

a syndrome comparator, coupled to the syndrome generator, for comparing the column syndrome to a predefined value, the predefined value being a same value for all columns in the data block, wherein an error in the column is signaled when the column syndrome does not match the predefined value; and a data corrector, activated when the error in the column is signaled, for determining the error location of the error within the column over-writing data in the column with the correction, wherein the column syndrome is not stored in the embedded DRAM but is immediately compared by the syndrome comparator, wherein the data block is read for syndrome generation and error-corrected while residing in the embedded DRAM.

3. The DVD controller chip of claim 2 wherein the predefined value is zero, wherein syndromes for all columns of all data blocks are compared to zero for error detection.

4. The DVD controller chip of claim 2 further comprising:

a row-syndrome generator, coupled to the disk interface, for generating a row syndrome for each row of the data block;

a row-syndrome writer, coupled to the row-syndrome generator and to the embedded DRAM, for writing the row syndrome to the embedded DRAM;

wherein the error corrector reads the row syndrome stored in the embedded DRAM, the error corrector including detection means for detecting errors in a row by comparing the row syndrome to the predefined value and row-correction means for over-writing a row error in the row with a row correction, wherein row syndromes but not column syndromes are stored in the embedded DRAM.

5. The DVD controller chip of claim 4 wherein the embedded DRAM comprises:

a disk-buffer region for storing a plurality of data blocks at different stages of error correction;

a row-syndrome buffer for storing the row syndromes for a data block in the disk-buffer region;

a host-buffer region for storing corrected data blocks for transfer to the host bus.

6. The DVD controller chip of claim 5 wherein the embedded DRAM further comprises:

a firmware-buffer region, coupled to a microcontroller, for storing parameters used by firmware routines executing on the microcontroller, the firmware routines for accessing the DVD optical disk, wherein the embedded DRAM also serves as a scratch-pad memory for the firmware routines executing on the microcontroller.

7. The DVD controller chip of claim 5 wherein each data block comprises 208 rows, and a row contains 182 bytes, including 10 error-correction-code ECC bytes and 172 data bytes, the data block having 182 columns, with a column having 16 ECC bytes and 192 data bytes, wherein the data block is an ECC data block that includes ECC bytes for columns and rows for redundant error correction.

8. The DVD controller chip of claim 7 wherein the ECC bytes are Reed-Solomon error-correction bytes.

9. The DVD controller chip of claim 5 further comprising:

a de-scrambler, coupled to the embedded DRAM, for reading the data block from the disk-buffer region and for re-ordering data in the data block to form a re-ordered data block, the de-scrambler including write-back means for writing the re-ordered data block to the host-buffer region in the embedded DRAM, wherein data blocks from the disk-buffer region are re-ordered and written back to the host-buffer region of the embedded DRAM.

10. The DVD controller chip of claim 9 further comprising:

an EDC checker, coupled to the de-scrambler, for generating an error-detection code EDC checksum of the data block as the data block is re-ordered by the descrambler, the EDC checker including compare means for comparing the EDC checksum to a stored checksum stored with the data block to determine if any errors remain in the data block, wherein EDC checksums are checked without an extra read of the embedded DRAM, the EDC checksum generated as the de-scrambler re-orders the data blocks.

11. The DVD controller chip of claim 9 wherein the de-scrambler further comprises:

a key generator and authenticator, for reading an encryption key from a hidden location on the DVD optical disk, the hidden location not readable by the host bus, for generating from the encryption key a second key for determining a re-ordering sequence used by the de-scrambler to re-order the data block, wherein the encryption key is used by the de-scrambler to re-order the data block.

12. The DVD controller chip of claim 9 wherein the de-scrambler further comprises:

stripping means, coupled to the write-back means, for removing the ECC bytes from the data bytes in the data block before writing the re-ordered data block to the host-buffer region of the embedded DRAM, wherein the host-buffer region does not store the ECC bytes while the disk-buffer region does store the ECC bytes in the data blocks.

13. The DVD controller chip of claim 1 wherein the embedded DRAM has a data-access width of at least 16 bytes, wherein the embedded DRAM is at least 128 bits wide.

14. A digital-versatile disk (DVD) optical-disk reader comprising:

a microcontroller for executing firmware routines for accessing a DVD optical disk;

a servo controller, coupled to the microcontroller, for positioning a laser over the DVD optical disk for reading;

a read channel, coupled to receive a data stream from the DVD optical disk, for amplifying a signal from the DVD optical disk and separating the signal into a clock and data;

a DVD controller chip, coupled to receive the data from the read channel and coupled to be controlled by the microcontroller, for correcting errors and buffering the data to a host, the DVD controller chip comprising:

a sync detector for detecting synchronization patterns in the data from the read channel;

a demodulator for converting run-length-limited (RLL) codewords of the data from the read channel into data-stream bytes;

an embedded dynamic-random-access memory (DRAM), coupled to receive the data-stream bytes into data blocks, for storing data blocks while the data blocks are error corrected;

an error corrector, coupled to read a data block from the embedded DRAM, for generating syndromes for the data block and correcting errors in the data block identified by the syndromes, the error corrector writing a correction to the data block in the embedded DRAM; and a host interface, coupled to the embedded DRAM, for transferring corrected data to a host, wherein an external DRAM is not used to buffer the data from the read channel to the host.

15. The DVD optical-disk reader of claim 14 further comprising:

a content-de-scrambler, coupled to the embedded DRAM, for reading a data block corrected by the error corrector and decrypting the data block using a key stored on the DVD optical disk to generated a de-scrambled data block;

wherein the content-de-scrambler includes means to write the de-scrambled data block to a host-buffer area of the embedded DRAM, the host-buffer area being a separate area of the embedded DRAM than a error-correction-buffer area of the embedded DRAM that stores the data blocks during correction by the error corrector, wherein corrected data blocks are de-scrambled and transferred to another area of the embedded DRAM.

16. The DVD optical-disk reader of claim 15 wherein the DVD optical-disk reader is compatible with compact-disk CD optical disks, wherein the content-de-scrambler is disabled when CD optical disks are played, wherein the host interface reads the de-scrambled data blocks from the host-buffer area of the embedded DRAM when DVD optical disks are played, but reads the data blocks from the error-correction-buffer area of the embedded DRAM when CD optical disks are played, wherein the host interface reads different areas of the embedded DRAM when DVD or CD optical disks are played.

17. The DVD optical-disk reader of claim 15 wherein the DVD controller chip further comprises:

a refresh sequencer for performing a refresh of the embedded DRAM;

an arbiter, coupled to the embedded DRAM, for determining a next requestor to access the embedded DRAM, the next requestor being selected from the refresh sequencer, error corrector, the host interface, the content de-scrambler, or writing of the data-stream bytes from the read channel, and address pointers for locating a next address to access the embedded DRAM.

18. The DVD optical-disk reader of claim 17 wherein the DVD controller chip further comprises:

a disk FIFO, receiving the data-stream bytes from the demodulator, for storing the data-stream bytes before writing to the embedded DRAM.

19. The DVD optical-disk reader of claim 17 wherein the demodulator converts 16-bit RLL codewords into 8-bit bytes.

20. digital-versatile disk (DVD) controller comprising:

disk interface means for receiving data read from a DVD optical disk;

embedded dynamic-random-access memory (DRAM) means, coupled to receive the read data from the disk interface means, the embedded DRAM means storing the read data arranged as data blocks for error correction, the data blocks having rows containing data and error-correction information, the embedded DRAM means including wide-access means for writing from the DVD optical disk or reading to a host at least 128 bits during each memory access;

error correction means, coupled to the embedded DRAM means, for reading the data blocks and determining an error location of an error in the data block, the error correction means over-writing data at the error location of the error in the data block with a correction;

de-scramble means, coupled to the embedded DRAM means, for reading the data block from a disk-buffer region and for re-ordering data in the data block to form a re-ordered data block, the de-scramble means including write-back means for writing the re-ordered data block to the host-buffer region in the embedded DRAM means; and host interface means, coupled to the embedded DRAM means, for transferring corrected and re-ordered data blocks to the host from the host-buffer region, wherein data blocks from the DVD optical disk are corrected and re-ordered in the embedded DRAM means before transfer to the host.

* * * * *